June 3, 1952  E. G. LINDER  2,598,925
METHOD AND MEANS FOR GENERATING ELECTRICAL
ENERGY FROM A RADIOACTIVE SOURCE
Filed June 25, 1946
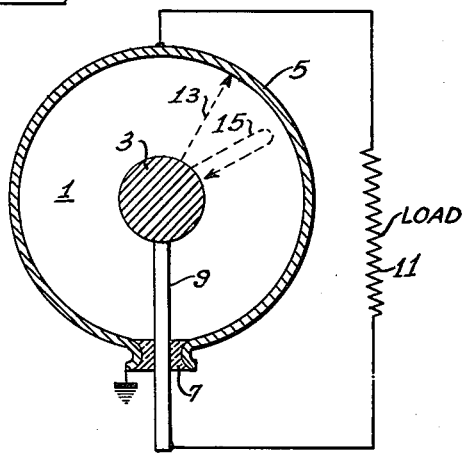
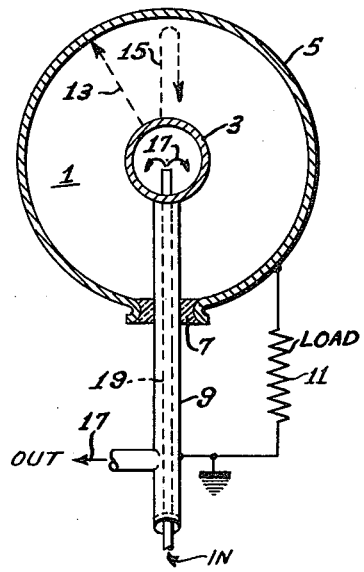
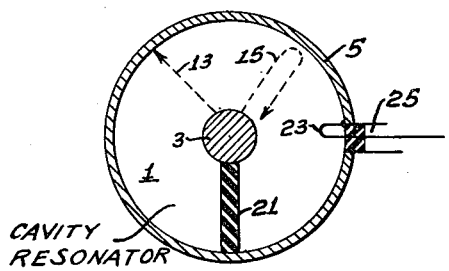
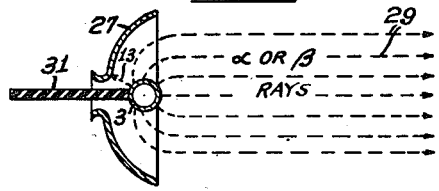
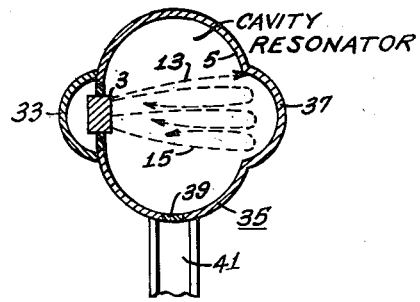
INVENTOR.
*Ernest G. Linder*
BY
ATTORNEY Patented June 3, 1952

2,598,925

UNITED STATES PATENT OFFICE 2,598,925

METHOD AND MEANS FOR GENERATING ELECTRICAL ENERGY FROM A RADIOACTIVE SOURCE

Ernest G. Linder, Princeton, N. J., assignor to Radio Corporation of America, a corporation of Delaware Application June 25, 1946, Serial No. 679,083

18 Claims. (Cl. 315—5)

This invention relates generally to the generation of electrical energy and more particularly to unique methods of and means for deriving and utilizing the electrical energy of nuclear reactions.

The enormous magntiudes of energy provided by certain nuclear reactions of radioactive substances provide a tremendous field for the development of new sources of electrical energy. Since some radioactive radiations (energy) are largely electrical in nature, it is desirable that such electrical energy be converted directly to electrical energy of usable form. The alpha-particle and beta-particle emissions from certain radioactive substances comprise positively or negatively charged particle rays, respectively, having energies which vary from low values to several million electron volts. For example, alpha-ray emission comprises positively charged particles having energies varying from zero to the order of ten million electron volts, while beta-particle emission comprises negatively charged particles having energies varying from low values to the order of three million electron volts. Different radioactive substances are known to provide either alpha-particle emission, beta-particle emission, or a combination of alpha-particle and beta-particle emission. The direct utilization of the high electrical potentials which may be derived from such charged particles provides much more convenient and efficient utilization of nuclear energy than previously proposed systems wherein the nuclear energy is converted to thermal energy, the thermal energy converted to mechanical energy, and the mechanical energy then converted to electrical energy in a usable form. Also, the direct utilization of the electrical energy of nuclear reactions may be much more readily controlled by electrical methods than may the conversion of nuclear energy to thermal energy.

The instant invention is related to the systems and methods disclosed and claimed in applicant's copending U. S. application, Serial No. 679,081, filed June 25, 1946, U. S. Patent 2,517,120, granted August 1, 1950, which contemplates the use of collector electrodes for collecting the charged particle rays from a radioactive source, and means for applying the resultant unidirectional potential between the source and collector electrodes to a load. A first embodiment of the invention utilizes a resonator collector electrode for establishing an oscillating field of said charged particles, and means for coupling a load to said oscillating field. A second embodiment of the invention utilizes the collector electrode as a charged particle reflector for establishing a focused charged particle beam.

Among the objects of the invention are to provide improved methods of and means for primarily generating electrical energy in response to nuclear reactions. Another object is to provide improved methods of and means for utilizing the electrical energy in nuclear reactions for generating microwave frequency electric potentials. A further object is to provide improved methods of and means for utilizing the electrical energy of nuclear reactions for generating alternating potentials. An additional object is to provide improved methods of and means for utilizing atomic energy for generating electrical energy. A still further object of the invention is to provide improved methods of and means for utilizing radioactive materials as sources of electrical energy.

Another object of the invention is to provide improved methods of and means for converting atomic energy directly to alternating electrical energy in commercially usable forms. An additional object is to provide improved methods of and means for employing nuclear reactions to generate relatively large microwave electrical currents. A further object is to provide improved methods of and means for utilizing either alpha-ray or beta-ray emission, or both, of nuclear reactions of radioactive materials for generating charged particle beams. A still further object is to provide improved methods of and means for segregating and separately utilizing the electrical energy of alpha-ray and beta-ray emissions of radioactive materials for generating electrical energy.

Other objects of the invention include improved methods of and means for converting the electrical energy of nuclear reactions of radioactive materials to high frequency electrical energy.

The various embodiments and features of the invention will be described in detail hereinafter by reference to the accompanying drawings of which Figure 1 is a schematic diagram of the basic embodiment of the invention including a simple unidirectional voltage generator disclosed in said copending application; Figure 2 is a schematic diagram of a modification of said basic embodiment of the invention; Figure 3 is a schematic diagram of a first embodiment of the instant invention comprising a simple high frequency electrical generator according to the invention; Figure 4 is a schematic diagram of a second embodiment of the instant invention comprising a charged particle beam source according to the invention; and Figure 5 is a cross-sectional, partially schematic view of a modification of said first and second embodiments of the instant invention comprising a high frequency generator utilizing focused charged particle beams. Similar reference characters are applied to similar elements throughout the drawings.

High-voltage D.-C. generators

Referring to the drawings, Figure 1 is included herein in order to explain the principles and operation of the basic features of the invention of said copending application and illustrates the simplest form of a unidirectional high voltage generator 1. The generator 1 includes a source 3 of alpha-rays or beta-rays derived from a quantity of radioactive material. A suitable alpha-ray radioactive source may comprise, for example, a quantity of polonium. Likewise, a suitable beta-ray source may comprise a suitable quantity of radioactive phosphorus ($_{15}P^{32}$). Radioactive phosphorus is a pure beta-ray emitter which becomes stable after emission. The materials are suitable for use as electronic power sources since they emit no gaseous reaction products and, therefore, are suitable for vacuum applications.

One gram of radioactive phosphorus occupies about .5 cubic centimeter and will emit about 2 milliamperes of electron current. The maximum energy of the beta rays is of the order of 1.7 million electron volts, but only a small fraction of the electron current would be available at such a high voltage. However, about 1 milliampere of current would be emitted at one megavolt. Since the average energy of emission would be about 1 million electron volts, the total rate of electrical energy production or power generated would be about 2 kilowatts. The half-life period of radioactive phosphorus ($_{15}P^{32}$) is about 14 days, and the current and power would decrease exponentially to one-half their initial values in that time.

The radioactive source 3 is surrounded, for example, by a spherical highly evacuated conductive collector electrode 5 having an aperture insulator 7 therein for a suitably insulated terminal 9 for the radioactive source 3. A load 11 is connected between the collector electrode 5 and the source terminal 9. If desired, the collector electrode 5 may be grounded.

In operation, and in the absence of a load, beta particles (electrons) emitted by the radioactive source 3 travel to the collector electrode 5 and charge it negatively as indicated by the dash line arrow 13. The charge upon the collector electrode is negative with respect to the source 3 and increases until the potential of the collector electrode is sufficiently high to repel additional electrons arriving from the source 3 as shown by the dash line arrow 15. If it is assumed that the radioactive source 3 emits 1 megavolt electron (beta rays), the potential of the collector electrode 5 would reach one megavolt and would be negative with respect to the radioactive source. If a load is connected between the collector electrode and the source terminal, a current will flow through the load and power will be dissipated therein. Thus the radioactive energy emitted in the beta-rays may be employed directly in its original electrical form to provide electrical energy.

Known beta-ray emitters provide electrons having energies from almost zero to 3 million electron volts. Known alpha-ray emitters provide positively charged alpha particles having energies from about zero to the order of 10 million electron volts. If desired, an alpha-particle source may be employed instead of a beta-particle source, in which case the collector electrode 5 will be charged positively until it reaches a potential sufficiently high to repel additional alpha particles. In such a modification of the invention, the collector electrode 5 becomes the positive terminal and the radioactive source 3 the negative terminal of the generator. Other particles than alpha or beta rays may obviously be used.

The electric current produced by any source of charged particles is $$i = e\frac{dn}{dt} \quad (1)$$

where $n$ is the number of particles emitted, $t$ is the time in seconds, and therefore $dn/dt$ is the rate of particle emission, and $e$ is the electrical charge per particle. If each particle carries more than one electronic charge, $e$ must be replaced by $\mu e$, where $\mu$ is the number of charges.

For a radioactive substance $$dn/dt = -\lambda n \quad (2)$$

(see Pollard and Davidson, Applied Nuclear Physics, p 105), where $\lambda$ is the decay constant and is related to the half life $t_H$ by the equation $$\lambda = \frac{0.693}{t_H} \quad (3)$$

From Equations 1, 2 and 3 it is seen that $$i = -\mu e n \frac{0.693}{t_H} \quad (4)$$

The number of atoms contained in a substance of mass M and atomic weight A is $$n = \frac{M}{m_H A} \quad (5)$$

where $m_H$ is the mass of the hydrogen atom. Thus $$i = \frac{0.693 M e}{m_H A t_H} \quad (6)$$

This relation may be expressed in amperes per gram for a predetermined quantity of a radioactive substance wherein $e = 1.59 \times 10^{-19}$ coulombs, $$M = 1 \text{ gram}, \quad m_H = 1.66 \times 10^{-24} \text{ grams}$$

and $t_H = 8.64 \times 10^4 T_H$, where $T_H$ is the half life in days. Therefore, $$i_1 = \frac{0.76 \mu}{A T_H} \quad (7)$$

If the radioactive source is polonium, $A = 210$ and $T_H = 140$, $\mu = 2$, therefore $$i_1 = \frac{0.76 \times 2}{210 \times 140} = 51.8 \times 10^{-6} \text{ amps./gram} \quad (8)$$

$$= 51.8 \text{ microamps./gram}$$

The characteristics of the charged particle emitting substance determine not only the output voltage of the generator, but also determine its impedance. Thus, since alpha particles generally have a very uniform energy, providing the source is a very thin element, the generated voltage would remain substantially constant until all the remaining current was drawn, whereupon the voltage would decrease rapidly. Thus, with an alpha-particle emitter, the generator would have a low effective internal impedance. In contradistinction thereto, beta particles are usually emitted over a wide energy range which may vary from a very low value to several million electron volts. Consequently, when current is drawn from the generator to a load, the load voltage would immediately drop to a much lower value than the no load maximum, as is characteristic of all generators having high internal impedance. The actual variation of load voltage with current would depend upon the particular characteristics of the beta-ray emitting material. In general the available power depends upon the quantity of radioactive material employed and upon its rate of particle emission. Materials which emit at high rates have short operating life, while materials emitting at low rates have relative longer operating lives. A D.-C. generator of the type described has particular application for systems requiring high voltage and low power capacity since in such instances only a relatively small amount of radioactive material is required for the alpha- or beta-ray source.

For generators providing relatively large power values, cooling of the charged particle source may be necessary or desirable since the source is bombarded and heated by the returning charged particles which are reflected by the charged collector electrode. Also the collector electrode is heated by the charged particles which it collects. A simple system for cooling the charged particle emitter is shown in Figure 2 wherein the charged particle source 3 comprises a relatively thin shell of radioactive material into which air or water under pressure may be forced for cooling purposes as indicated by the arrows 17. The radioactive source terminal 9 may comprise a hollow tube forming a cooling fluid outlet and a coaxially disposed inner tube 19 forming a cooling fluid inlet. If desired, the collector electrode 5 may be cooled by air blasts.

*Alternating current generator*

Referring to Figure 3, a device similar to the high voltage D.-C. generator may be employed for generating alternating energy. Such a device is especially suitable for the generation of high frequency energy since the collector electrode may be proportioned to resonate at the desired radio frequency. For example, the radioactive source 3 may be selected to emit negatively charged beta-particles which charge the resonated collector electrode 5 to a high negative potential as indicated by the dash line arrow 13. The source 3 is supported within the collector electrode 5 by any suitably shaped insulator 21. When the resonant collector electrode 5 reaches the maximum potential of the beta particles, additional beta particles are reflected back toward the source as indicated by the dash line arrow 15. Since the collector electrode is resonated to the resired radio frequency, the reflected electrons oscillate back and forth between the source and the collector electrode, thus establishing an oscillating electric field within the resonant collector electrode. Radio frequency energy may be abstracted from the oscillating field, for example, by a coupling loop 23 terminating a coaxial line 25 which may be connected to a load, not shown. It should be understood that radio frequency energy may be abstracted from the oscillating field in any other manner known in the microwave art.

The efficiency of microwave generation is enhanced by the fact that the beta-particle source may be considered of relatively high impedance, and the cavity resonator formed by the collector electrode 5 also is of high impedance. Since the velocity of the beta particles approaches that of light waves, it is possible to utilize relatively large spacings between the source and the collector electrode, thereby permitting cavity resonator design of high impedance and practical proportions for extremely high frequencies. The operation is similar to that of the reflex, velocity modulation oscillator or to the older Barkhausen-Kurz oscillator. Assuming a radial radio frequency electric field in the resonator, electrons emitted in phase will be accelerated and collected by the collector shell, while those emitted out of phase will be decelerated, reflected by the shell, and thus continue to oscillate and deliver energy to the oscillating field.

*Charged particle gun*

An important element of many electronic devices including some types of oscillators is an electron, or charged particle, gun for projecting beams of negatively or positively charged particles. Customary types of such systems utilize a plurality of electrodes maintained at fixed potentials, or systems of magnets, for focusing and controlling the charged particle beam. In the instant invention, magnetic control of the charged particle beam would appear to be impractical since the required magnetic fields would be of enormous magnitude. The potentials applied to the focusing electrodes to provide the required high magnitude electric fields may however be derived directly from D.-C. generators of the type described heretofore by reference to Fig. 1. Since any other control potentials, such as grid bias voltages, suitable for controlling the high voltage charged particles must be of extremely large magnitude, if desired, such auxiliary radioactive D.-C. generators may be employed for supplying such potentials.

According to the instant invention, a high velocity electron gun may be provided as shown in Fig. 4 by utilizing the self-biasing of a focusing electrode 27 in response to beta-particle emission from a radioactive source 3. If the focusing electrode 27 is shaped, for example, in concave form partially surrounding the emitter, the beta particles emitted from the radioactive source 3 charge the focusing electrode to the maximum negative potential of the charged particles. Thence additional charged particles emitted by the source 3 are reflected and focused to form an electron beam indicated by the dash lines 29.

The same arrangement may be utilized for a radioactive source 3 which emits only alpha rays whereby the focused beam 29 will comprise alpha particles which are reflected by the positively charged focusing electrode 27. The radioactive source 3, in either instance, is supported at the focus of the reflector 27 by means of an insulating support 31. The use of an alpha-particle radioactive source is preferable to that of a beta-particle source since alpha rays are emitted with much more uniform energies than beta rays, and hence the alpha particles would be focused in the beam 29 much more uniformly than would be the case with beta particles which differ widely in emission energy.

*Beam type alternating current generator*

The principles of the devices described heretofore by reference to Figures 3 and 4 may be combined in a simple oscillator, shown in Figure 5, wherein the radioactive source 3 is at the focus of a focusing electrode 33 forming a portion of an evacuated cavity resonator 35. A second focusing electrode 37, also forming a portion of the cavity resonator 35, is disposed diagonally opposite to the source 3 and to the first focusing electrode 33. The focusing electrodes are charged to the maximum potential of the charged particles derived from the source 3 as indicated by the dash line arrow 13. Additional charged particles derived from the source 3 are reflected back toward the source as indicated by the dash line arrows 15. For example, with a radioactive emitter providing two m. e. v. alpha particles, the cavity resonator wall 35 and the focusing electrodes 33 and 37 would assume a potential of two megavolts. Since the cavity resonator is shaped and proportioned to resonate at the desired microwave frequency which must be a function of the charged particle motion, and is proportioned and arranged to focus the charged particle beam as indicated in the drawing, additional charged particles derived from the source 3 will be reflected back and forth within the cavity resonator and will deliver energy to establish an oscillating electric field therein in the same manner as described heretofore by reference to Figure 3. Microwave energy may be derived from the oscillating field within the cavity resonator 35 through a window 39 in the cavity resonator wall which opens into a waveguide 41 which may be coupled to a load, not shown.

Following is a partial list of alpha- and beta-ray emitters which are suitable for high voltage generators of the types described heretofore:

ALPHA-RAY EMITTERS

| Element | Half-life (days) | Energy (equivalent million electron volts) |
| --- | --- | --- |
| Polonium ($Po^{210}$) | 140 | 5.25 |
| Actinium ($Ac^{223}$) | 11.2 | 5.66 |
| Thorium X ($Th X^{224}$) | 3.64 | 5.65 |
| Radio actinium ($Rd Ac^{227}$) | 13.9 | 5.92 |

BETA-RAY EMITTERS

| Element | Half-life (days) | Energy (equivalent million electron volts) |
| --- | --- | --- |
| Phosphorus ($P^{32}$) | 14 | 1.7 |
| Calcium ($Ca^{45}$) | 180 | 0.2 / 0.9 |
| Scandium ($Sc^{46}$) | 85 | 0.26 / 1.5 |
| Iron ($Fe^{59}$) | 47 | 0.4 / 0.9 |
| Arsenic ($As^{71}$) | 16 | 1.3 |
| Strontium ($Sr^{89}$) | 55 | 1.5 |
| Antimony ($Sb^{121}$) | 60 | 1.53 |
| Tungsten ($W^{188}$) | 77 | 0.5 |

Thus the invention described and claimed herein comprises unique methods of and means for generating unidirectional or alternating potentials by utilizing directly the electrical properties of radioactive emission. Such generators may provide high or low unidirectional potentials with relatively low or relatively high current output, respectively; alternating potentials including A.-C. energy of microwave frequency; and positively or negatively charged particle beams which may be focused in any desired manner. Control and focusing potentials for said devices may be provided by auxiliary radioactive generators, or self-biasing arrangements may be employed.

I claim as my invention:

1. The method of utilizing a source of radioactive charged particle radiations for primarily generating electrical energy comprising collecting a first portion of said radiations in a region adjacent to said source to establish a voltage with respect to said source, establishing an electric field in response to said voltage to reflect a second portion of said radiations, and utilizing the electrical energy of said reflected radiations to actuate a load device.

2. The method of utilizing a source of radioactive charged particle radiations for primarily generating alternating electrical energy comprising collecting a first portion of said radiations in a region adjacent to said source to establish a potential gradient with respect to said source, reflecting a second portion of said radiation back toward said source in response to said potential gradient, resonating said reflected radiation, and deriving alternating electrical energy from said resonated reflected radiation.

3. The method of utilizing a source of radioactive charged particle radiations for primarily generating a charged particle beam comprising collecting a first portion of said radiations in a region adjacent to said source to establish in said region a potential gradient with respect to said source and utilizing said potential gradient to reflect a second portion of said radiation as a charged particle beam.

4. The method of utilizing a source of radioactive charged particle radiations for primarily generating a charged particle beam comprising collecting a first portion of said radiations in a region adjacent to said source to establish in said region a potential gradient with respect to said source and utilizing said potential gradient to reflect and focus a second portion of said radiation as a charged particle beam.

5. A charged particle primary source including a source of radioactive material providing charged particle radiation, and an electrode disposed adjacent to said source for collecting a first portion of said radiated particles for establishing a voltage with respect to said source, said voltage providing reflection of a second portion of said radiated particles to provide a reflected charged particle beam.

6. Apparatus according to claim 5 wherein said electrode is positioned adjacent to and proportioned with respect to said source to focus said reflected beam.

7. An electron primary source including a source of radioactive material providing charged particle radiation, and an electrode disposed adjacent to said source for collecting a first portion of said radiated particles for establishing a voltage with respect to said source, said voltage providing reflection of a second portion of said radiated particles to provide a reflected electron beam.

8. A microwave electron generator including a source of radioactive material providing charged particle emission, an electrode disposed adjacent to and substantially surrounding said source and resonant to the average transit time of a first portion of said particle emission for collecting a second portion of said emitted particles to derive a voltage between said electrode and said source to establish an electric field therebetween, said electrode being positioned adjacent to said source and proportioned to focus a third portion of said first portion of said particle emission.

9. Apparatus according to claim 8 wherein said electrode is a hollow body cavity resonator.

10. Apparatus for primarily generating electrical energy including a source of radioactive material providing charged particle emission, means disposed in a region adjacent to and substantially surrounding said source for collecting a first portion of said particle emission to derive a first potential with respect to said source and to establish an electric field between said source and said collecting means, said potential providing reflection within said field of a second portion of said particle emission, means for resonating said collecting means to the transit time of at least some of said emitted particles whereby said reflected particles oscillate and deliver energy to said field, and means for abstracting alternating electrical energy from said field.

11. Apparatus for primarily generating electrical energy including a source of radioactive material providing charged particle emission, means disposed in a region adjacent to and substantially surrounding said source for collecting a first portion of said particle emission to derive a first potential with respect to said source and to establish an electric field between said source and said collecting means, said potential providing reflection within said field of a second portion of said particle emission, means for resonating said collecting means to the transit time of at least some of said emitted particles whereby said reflected particles oscillate and deliver energy to said field, and a waveguide opening into said resonant means for abstracting alternating electrical energy from said field.

12. Apparatus for primarily generating electrical energy including a source of radioactive material providing charged particle emission, means disposed in a region adjacent to and substantially surrounding said source for collecting a first portion of said particle emission to derive a first potential with respect to said source and to establish an electric field between said source and said collecting means, said potential providing reflection within said field of a second portion of said particle emission, means for resonating said collecting means to the transit time of at least some of said emitted particles whereby said reflected particles oscillate and deliver energy to said field, and means coupled into said oscillating field for abstracting alternating electrical energy from said field.

13. Apparatus for primarily generating electrically energy including a source of radioactive material providing alpha-particle emission, means disposed in a region adjacent to and substantially surrounding said source for collecting a first portion of said particle emission to derive a first potential with respect to said source and to establish an electric field between said source and said collecting means, said potential providing reflection within said field of a second portion of said particle emission, means for resonating said collecting means to the transit time of at least some of said emitted particles whereby said reflected particles oscillate and delivery energy to said field, and means for abstracting alternating electrical energy from said field.

14. Apparatus for primarily generating electrical energy including a source of radioactive material providing beta-particle emission, means disposed in a region adjacent to and substantially surrounding said source for collecting a first portion of said particle emission to derive a first potential with respect to said source and to establish an electric field between said source and said collecting means, said potential providing reflection within said field of a second portion of said particle emission, means for resonating said collecting means to the transit time of at least some of said emitted particles whereby said reflected particles oscillate and deliver energy to said field, and means for abstracting alternating electrical energy from said field.

15. A charged particle primary source including a source of radioactive material providing charged particle radiation, an electrode insulated from and disposed adjacent to said source for collecting a first portion of said radiation for establishing on said electrode a voltage with respect to said source, said voltage providing reflection of a second portion of said radiation to provide a reflected charged particle beam, and means for utilizing said reflected beam.

16. Apparatus according to claim 15 wherein said electrode is positioned adjacent to and proportioned with respect to said source to focus said reflected beam.

17. Apparatus for primarily generating electrical energy including a source of radioactive charged particle radiations, means for collecting a first portion of said radiations in a region adjacent to said source to establish a voltage with respect to said source whereby said voltage reflects a second portion of said radiations, and means for utilizing the electrical energy of said reflected radiations to actuate a load device.

18. A charged particle primary emitter comprising a source of charged particle emission, a support for said source, an electrode disposed adjacent to said source and responsive to emission therefrom to attain a potential with respect to said source and said support, the potentials on said support and said electrode providing a field to direct a portion of said emission in a predetermined region with respect to said source and load means for utilizing said directed emission.

ERNEST G. LINDER.

REFERENCES CITED

The following references are of record in the file of this patent:

UNITED STATES PATENTS

| Number | Name | Date |
|---|---|---|
| 1,523,013 | Greenslade | Jan. 13, 1925 |
| 1,748,386 | Loewe | Feb. 25, 1930 |
| 2,153,728 | Southworth | Apr. 11, 1939 |
| 2,170,219 | Seiler | Aug. 22, 1939 |
| 2,287,845 | Varian et al. | June 30, 1942 |
| 2,372,213 | Litton | Mar. 27, 1945 |
| 2,383,343 | Ryan | Aug. 21, 1945 |
| 2,416,303 | Parker | Feb. 25, 1947 |
| 2,417,551 | Hill | Mar. 18, 1947 |